US005129230A

United States Patent [19]

Izumi et al.

[11] Patent Number: 5,129,230

[45] Date of Patent: Jul. 14, 1992

[54] CONTROL SYSTEM FOR LOAD SENSING HYDRAULIC DRIVE CIRCUIT

[75] Inventors: Eiki Izumi, Ibaraki; Hiroshi Watanabe, Ushiku, both of Japan

[73] Assignee: Hitachi Construction Machinery Co., Ltd., Tokyo, Japan

[21] Appl. No.: 717,022

[22] Filed: Jun. 18, 1991

[30] Foreign Application Priority Data

Jun. 19, 1990 [JP] Japan .................................. 2-160824

[51] Int. Cl.[5] .............................................. F16D 31/02

[52] U.S. Cl. ......................................... 60/452; 60/450; 60/468

[58] Field of Search ................. 60/420, 450, 452, 468, 60/368

[56] References Cited

U.S. PATENT DOCUMENTS

| | | | |
|---|---|---|---|
| 3,976,097 | 8/1976 | Brakel . | |
| 4,120,233 | 10/1978 | Heiser | 91/518 |
| 4,468,173 | 8/1984 | Dantlgraber | 60/468 |
| 4,523,430 | 6/1985 | Masuda | 60/450 |
| 4,617,854 | 10/1986 | Kropp . | |
| 4,738,102 | 4/1988 | Kropp | 60/452 |
| 4,967,557 | 11/1990 | Izumi et al. | 60/452 |

FOREIGN PATENT DOCUMENTS

A13422165 12/1984 Fed. Rep. of Germany .

*Primary Examiner*—Edward K. Look
*Assistant Examiner*—F. Daniel Lopez
*Attorney, Agent, or Firm*—Fay, Sharpe, Beall, Fagan, Minnich & Mckee

[57] ABSTRACT

A load sensing hydraulic drive circuit comprises a variable displacement pump delivering fluid to a flow control valve for controlling flow to an actuator. A pump controller controls a delivery rate of the pump such that a differential pressure between a delivery pressure of the pump and a load pressure of the actuator is equal to a first predetermined value. An unloading valve is connected between the pump and the flow control valve for holding the differential pressure between the delivery pressure of the pump and the load pressure of the actuator less than a second predetermined value. A demanded flow rate of the flow control valve is detected and the unloader valve is controlled based on the demanded flow rate such that when the demanded flow rate is small, the second predetermined value is smaller than the first predetermined value, and when the demanded flow rate increases, the second predetermined value becomes larger than the first predetermined value. This allows stable control of the differential pressure for both large and small changes in operation of the flow control valve.

8 Claims, 14 Drawing Sheets

CONTROL SYSTEM FOR LOAD SENSING HYDRAULIC DRIVE CIRCUIT

BACKGROUND OF THE INVENTION

The present invention relates to a control system for a load sensing hydraulic drive circuit used in hydraulic machines such as hydraulic excavators or cranes, and more particularly to a control system for a load sensing hydraulic drive circuit equipped with pump control means which controls a delivery pressure of a hydraulic pump so as to hold it higher by a predetermined value than a load pressure of a hydraulic actuator.

Hydraulic drive circuits for use in hydraulic machines such as hydraulic excavators or cranes each comprise at least one hydraulic pump, at least one hydraulic actuator driven by a hydraulic fluid delivered from the hydraulic pump, and a flow control valve connected between the hydraulic pump and the actuator for controlling a flow rate of the hydraulic fluid supplied to the actuator. It is known that some of those hydraulic drive circuits employs a technique called load sensing control (LS control) for controlling a delivery rate of the hydraulic pump (thereby constituting an LS regulator). The LS control is to control the delivery rate of the hydraulic pump such that the delivery pressure of the hydraulic pump is held higher by a predetermined value than the load pressure of the hydraulic actuator. This causes the delivery rate of the hydraulic pump to be controlled dependent on the load pressured of the hydraulic actuator, and thus permits economic operation. Also, connected to a delivery line of the hydraulic pump is an unloading valve for holding a differential pressure between the delivery pressure of the hydraulic pump and a maximum load pressure among the actuators less than a setting value.

Meanwhile, the LS control is carried out by detecting a differential pressure (LS differential pressure) between the delivery pressure and the load pressure, and controlling the displacement volume of the hydraulic pump, or the position (tilting amount) of a swash plate in the case of a swash plate pump, in response to a deviation between the LS differential pressure and a differential pressure target value. To date, the detection of the differential pressure and the control of tilting amount of the swash plate have usually been carried out in a hydraulic manner as disclosed in U.S. Pat. No. 4,617,854 (corresponding to DE, A1, 3422165), for example. This conventional arrangement will briefly be described below.

An LS regulator disclosed in JP, A, 60-11706 comprises a control valve having one end subjected to a delivery pressure of a hydraulic pump and the other end subjected to both a maximum load pressure among a plurality of actuators and an urging force of a spring, and a cylinder unit operation of which is controlled by a hydraulic fluid passing through the control valve for regulating the swash plate position of the hydraulic pump. The spring at one end of the control valve is to set a target value of the LS differential pressure. Depending on a deviation occurred between the LS differential pressure and the target value thereof, the control valve is driven and the cylinder unit is operated to regulate the swash plate position, whereby the pump delivery rate is controlled so that the LS differential pressure is held at the target value. The cylinder unit has a spring built therein to apply an urging force in opposite relation to the direction in which the cylinder unit is driven upon inflow of the hydraulic fluid.

In the above LS regulator, a tilting speed of the swash plate of the hydraulic pump is determined by a flow rate of the hydraulic fluid flowing into the cylinder unit, while the flow rate of the hydraulic fluid is determined by both an opening, i.e., an position, of the control valve and the setting of the spring in the cylinder unit. The position opf the control valve is, in turn, determined by the relative relationship between the urging force of the LS differential pressure and the spring force for setting the target value of the differential pressure. Here, the spring in the control valve and the spring in the cylinder unit have their specific spring constants. Accordingly, a control gain for the tilting speed of the swash plate dependent on the deviation between the LS differential pressure and the target value thereof is always constant.

On the other hand, the unloading valve is generally operated in response to a signal indicative of the difference between the delivery pressure of the hydraulic pump and the maximum load pressure among the actuators, such that when the LS differential pressure exceeds a setting value of a spring disposed in the unloading valve for such reason as a response delay of the LS regulator, the hydraulic fluid in the delivery line of the hydraulic pump is discharged to a reservoir through the unloading valve, thereby maintaining the preset differential pressure in a quick manner. Usually, the preset differential pressure of the spring in the unloading valve is selected to be slightly higher than the preset differential pressure of the spring in the LS regulator's control valve.

However, the above conventional control system for the load sensing hydraulic drive circuit has suffered from problems below.

The LS regulator is intended to, as stated above, control the swash plate position dependent on the signal indicative of the difference between the delivery pressure of the hydraulic pump and the maximum load pressure among the actuators, thereby holding the LS differential pressure at the setting value of the spring in the control valve. During the LS control, when an operation (input) amount (i.e., a demanded flow rate) of the flow control valve is small and so is an opening of the flow control valve, the delivery pressure of the hydraulic pump is substantially determined by a difference between the flow rate flowing into a line, extending from the hydraulic pump to the flow control valve, and the flow rate flowing out of the line, as well as the volume modulus of the line. The volume modulus of the line is given by dividing the volue modulus of the hydraulic fluid (oil) by the volume of the line. Since the volume of the line is very small, the volume modulus of the line takes a large value as the opening of the flow control valve is small. Even with slight change in the flow rate, therefore, the delivery pressure is so greatly changed as to cause a hunting and thus render the control of the LS differential pressure difficult.

On the contrary, when the operation amount of the flow control valve is increased to enlarge the opening thereof, the circuit into which the delivery rate of the hydraulic pump flows now takes the large volume including a cylinder, resultig in the smaller volume modulus. Therefore, change in the delivery pressure upon change in the delivery rate of the hydraulic pump is reduced, making it easy to carry out the control of the LS differential pressure.

Accordingly, in order to reliably perform the control of the LS differential pressure over a range of the entire operation amount of the flow control valve, it is required to allow easy implementation of the control of the LS differential pressure when the opening of the flow control valve is small. This could be achieved by setting the control gain of the LS regulator, i.e., the setting values of the aforesaid two springs such that the changing or tilting speed of the swash plate of the hydraulic pump becomes slow. However, if the control gain is so set, there would arise another problem that when the opening of the flow control valve is large, the volume modulus is reduced as mentioned before, which also reduces a change rate of the LS differential pressure and thus degrades a response of the LS control.

In addition, there is also known a control system in which a pump of fixed displacement volume type is used as the hydraulic pump, and unloading valve is connected to a delivery line of the pump, and the differential pressure between the pump delivery pressure and the maximum load pressure among the actuators under the action of the unloading valve only. One of this type control system is disclosed in U.S. Pat. No. 3,976,097, for example.

An object of the present invention is to provide a control system for a load sensing hydraulic drive circuit for controlling a pump delivery rate, which can realize stable control of the LS differential pressure with small pressure change even when the operation amount of a flow control valve is small, and which can also control the hydraulic pump with a quick response when the operation amount of the flow control valve is large.

SUMMARY OF THE INVENTION

To achieve the above object, according to the present invention, there is provided a control system for a load sensing hydraulic drive circuit comprising at least one hydraulic pump provided with displacement volume varying means, at least one hydraulic actuator driven by a hydraulic fluid delivered from said hydraulic pump, a flow control valve connected between said hydraulic pump and said actuator for controlling a flow rate of the hydraulic fluid supplied to said actuator, pump control means for controlling a delivery rate of said hydraulic pump such that a delivery pressure of said hydraulic pump is higher by a first predetermined value than a load pressure of said actuator, and an unloading valve connected between said hydraulic pump and said actuator for holding a differential pressure between the delivery pressure of said hydraulic pump and the load pressure of said actuator less than a second predetermined value, wherein said control system further comprises first means for detecting a value associated with a demanded flow rate of said flow control valve, and second means for controlling said unloading valve based on said value associated with the demanded flow rate detected by said first means such that said second predetermined value is smaller than said first predetermined value when said demanded flow rate is small, and said second predetermined value becomes larger than said first predetermined value as said demanded flow rate increases.

With the present invention arranged as stated above, when the operation amount of the flow control valve is small and so is the demanded flow rate, the second predetermined value given as a setting value of the unloading valve becomes smaller than the first predetermined value given as a setting value of the pump control means, whereby the unloading valve functions with priority over the pump control means so that the differential pressure between the delivery pressure of the hydraulic pump and the load pressure of the actuator is controlled by the unloading valve. As a resulti, stable control of the differential pressure can be achieved through the unloading valve. When the operation amount of the flow control valve is increased and so is the demanded flow rate, the setting value of the unloading valve becomes so large as to exceed the setting value of the pump control means. In this condition, therefore, the differential pressure between the delivery pressure of the hydraulic pump and the load pressure of the actuator is controlled by the pump control means. Thus, by setting a control gain of the pump control means such that a changing speed of the displacement volume varying means of the hydraulic pump takes an optimum value when the operation amount of the flow control valve is large, quick control of the pump flow rate can be achieved. In addition, the hydraulic fluid will not be discharged from the unloading valve, resulting in no energy loss.

Preferably, said pump control means includes third means for determning, based on the differential pressure between the delivery pressure of said hydraulic pump and the load pressure of said actuator, a target displacement volume adapted to hold said differential pressure at said first predetermined value, and fourth means for controlling said displacement volume means of said hydraulic pump such that a displacement volume of said hydraulic pump coincides with the target displacement volume determined by said third means; said first means comprises means for detecting, as said value associated with the demanded flow rate, the target displacement volume determined by said third means; and said second means comprises means for controlling said unloading valve based on said target displacement volume.

Preferably, said first means comprises means for detecting, as said value associated with the demanded flow rate, an actual displacement volume of said hydraulic pump, and said second means comprises means for controlling said unloading valve based on said actual displacement volume.

Preferably, said first means comprises means for detecting, as said value associated with the demanded flow rate, an operation amount of said flow control valve, and said second means comprises means for controlling said unloading valve based on said operation amount. In this connection, in a control system for a load sensing hydraulic drive circuit comprising a plurality of hydraulic actuators driven by the hydraulic fluid delivered from said hyraulic pump, and a plurality of flow control valves respectively connected between said hydraulic pump and said plural actuators for controlling flow rates of the hydraulic fluid supplied to said actuators, said first means comprises means for detecting, as said value associated with the demanded flow rate, respective operation amounts of said plural flow control valves, and means for calculating a total value of the operation amounts detected; and said second means comprises means for controlling said unloading valve based on said total value of the operation amounts.

Preferably, said second means includes means for calculating, based on said value associated with the demanded flow rate detected by said first means, a control force serving to make said second predetermined value smaller than said first predetermined value when said demanded flow rate is small and to make said second predetermined value larger than said first predetermined value as said demanded flow rate increases, and then outputting an electric signal dependent on the calculated control force, and means for receiving said electric signal to produce said control force.

Furthermore, said unloading valve preferably has a spring for applying an urging force in the valve-closing direction, and drive means for applying a control force in the valve-opening direction; and said second means includes means for determining, based on said value associated with the demanded flow rate detected by said first means, a control force that is large when said demanded flow rate is small and becomes smaller as said demanded flow rate increases, and means for causing the drive means of said unloading valve to produce said control force.

Said unloading valve may be arranged to have drive means for applying a control force in the valve-closing direction. In this case, said second means includes means for determining, based on said value associated with the demanded flow rate detected by said first means, a control force that is small when said demanded flow rate is small and becomes larger as said demanded flow rate increaseds, and means for causing the drive means of said unloading valve to produce said control force.

DESCRIPTION OF THE PREFERRED EMBODIMENTS

Hereinafter, several embodiments of the present invention will be described with reference to the accompanying drawings. To begin with, a first embodiment of the present invention will be explained by referring to FIGS. 1-9.

Figure 1:
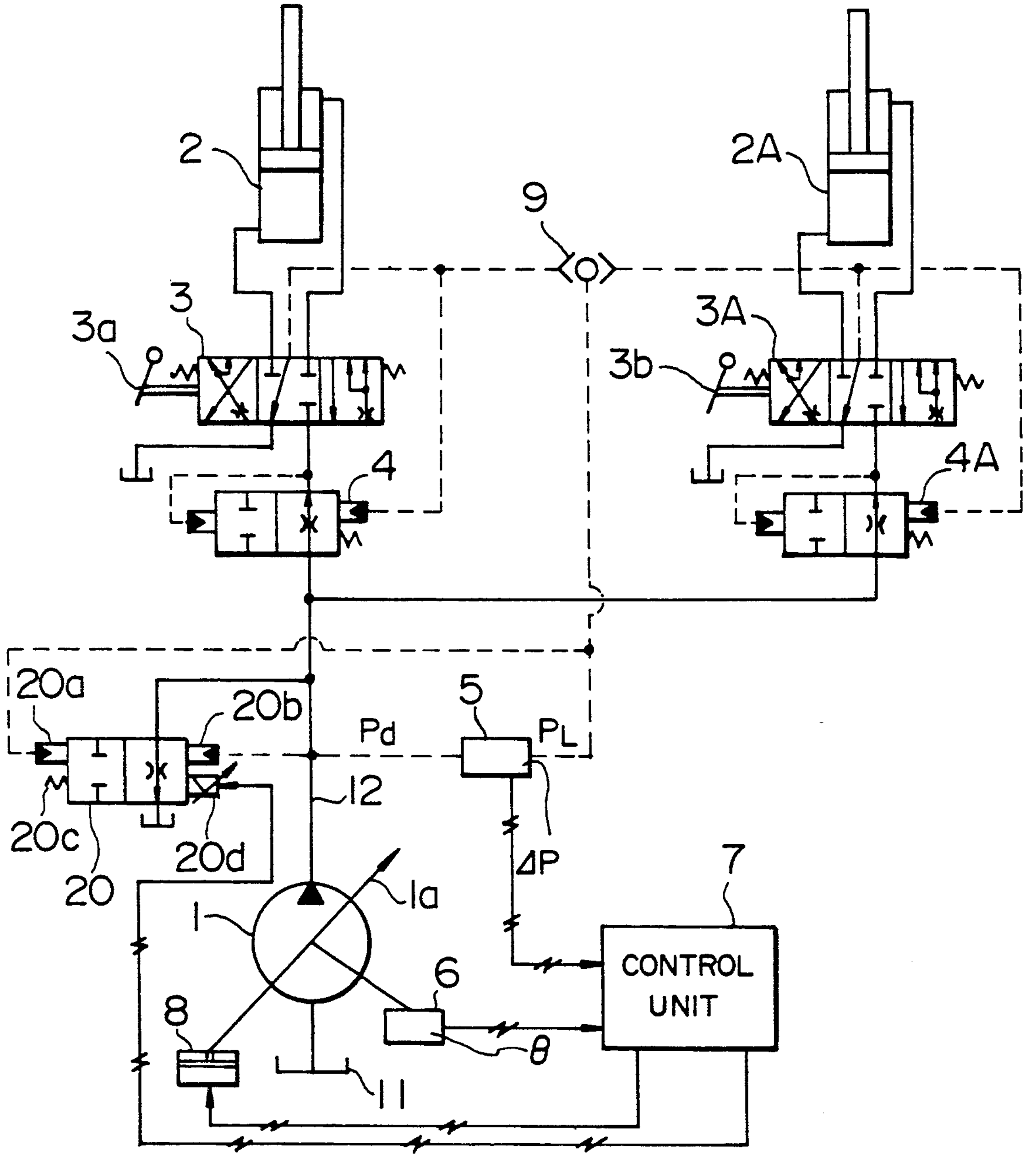
FIG. 1 is a schematic diagram of a load sensing hydraulic drive circuit equipped with a control system according to a first embodiment of the present invention.

In FIG. 1, a hydraulic drive circuit according to this embodiment comprises a hydraulic pump 1, a plurality of hydraulic actuators 2, 2A driven by a hydraulic fluid delivered from the hydraulic pump 1, flow control valves 3, 3A connected between the hydraulic pump 1 and the actuators 2, 2A controlling flow rates of the hydraulic fluid supplied to the actuators, 2, 2A dependent on operation of control levers 3*a*, 3*b*, respectively, and pressure compensating valves 4, 4A for holding constant differential pressures between the upstream and downstream sides of the flow control valves 3, 3A, i.e., differential pressures across the valves 3, 3A, to control the flow rates of the hydraulic fluid passing through the flow control valves 3, 3A to values in proportion to openings of the flow control valves 3, 3A, respectively. A set of the flow control valve 3 and the pressure compensating valve 4 constitutes one pressure compensated flow control valve, while a set of the flow control valve 3A and the pressure compensating valve 4A constitutes another pressure compensated flow control valve. The hydraulic pump 1 has a swash plate 1*a* as a displacement volume varying mechanism.

For the hydraulic drive circuit thus arranged, there is provided a control system of this embodiment which comprises a differential pressure sensor 5, a swash plate position sensor 6, a control unit 7, a swash plate position controller 8, and an unloading valve 20.

The differential pressure sensor 5 detects a differential pressure between a maximum load pressure PL among the plurality of hydraulic actuators including the actuator 2, which is selected by a shuttle valve 9, and a delivery pressure Pd of the hydraulic pump 1. i.e., an LS differential pressure, and converts it into an electric signal $\Delta P$ for outputting to the control unit 7. The swash plate position sensor 6 detects a position of a swash plate 1*a* of the hydraulic pump 1 and converts is into an electric signal $\theta$ for outputting to the control unit 7. Based on the electric signals $\Delta P$ and $\theta$, the control unit 7 calculates a drive signal for the swash plate 1*a* of the hydraulic pump 1 and a drive signal for an (electromagnetic) proportional solenoid 20*d* (described later) of the unloading valve 20, followed by outputting those drive signals to the swash plate position controller 8 and the proportional solenoid 20*d* of the unloading valve 20, respectively.

Figure 2:
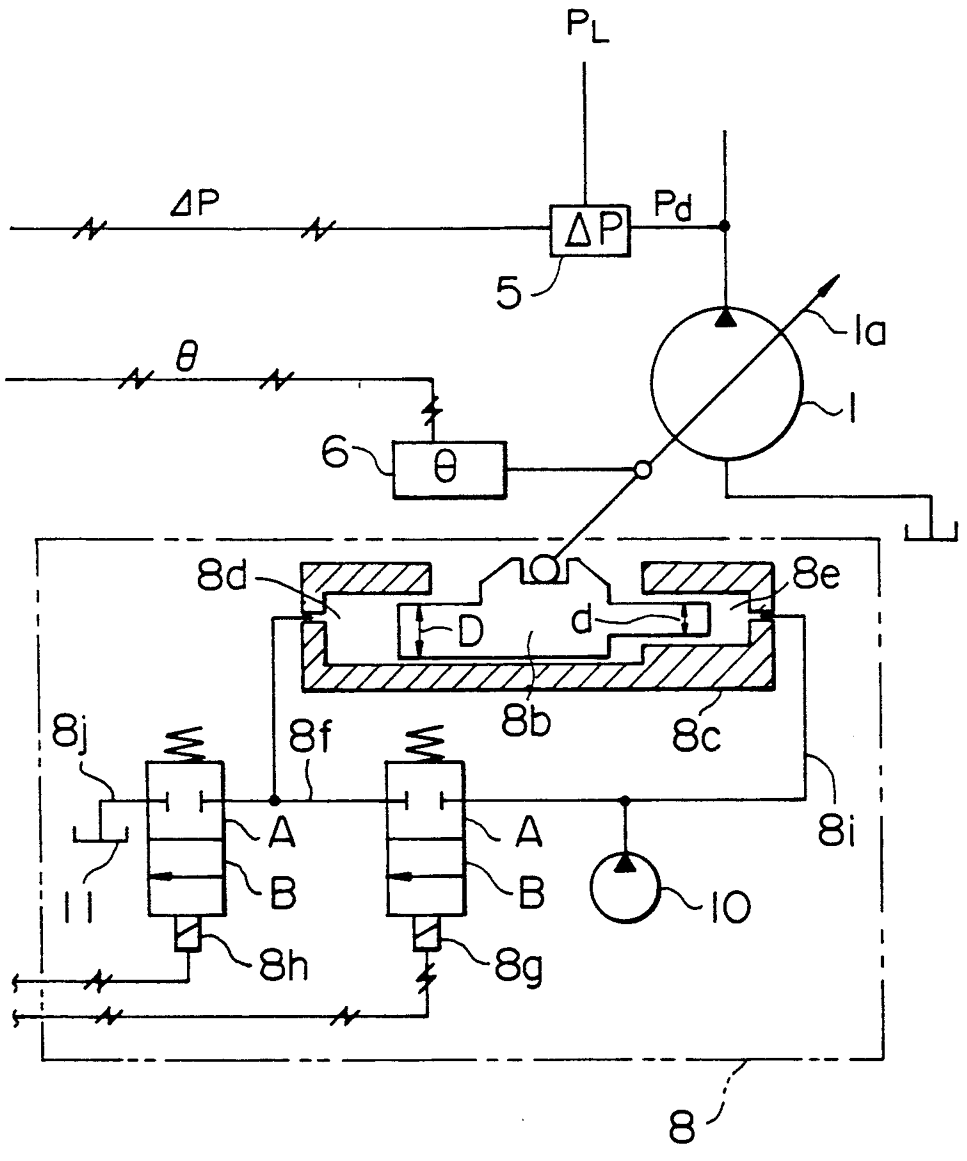
FIG. 2 is a schematic diagram of a swash plate position controller.

The swash plate position controller 8 is constituted as an electro-hydraulic servo mechanism as shown in FIG. 2, by way of example.

More specifically, the swash plate position controller 8 has a servo piston 8*b* for driving the swash plate 1*a* of the hydraulic pump 1, the servo piston 8*b* being housed in a servo cylinder 8*c*. A cylinder chamber of the servo cylinder 8*c* is partitioned by the servo piston 8*b* into a left-hand chamber 8*d* and a right-hand chamber 8*e*. These chambers are formed such that the cross-sectional area D of the left-hand chamber 18*d* is larger than the cross-sectional area d of the right-hand chamber 8*e*.

The left-hand chamber 8*d* of the servo cylinder 8*c* is communicated with a hydraulic source 10 such as a pilot pump via a line 8*f*, and the right-hand chamber 8*e* of the servo cylinder 8*c* is communicated with the hydraulic source 10 via a line 8*i*, the line 8*f* being communicated with a reservoir (tank) 11 via a return line 8*j*. A solenoid valve 8*g* is interposed in the line 8*f*, and a solenoid valve 8*h* is interposed in the return line 8*j*. These solenoid valves 8*g*, 8*h* are each a normally closed solenoid valve (with the function of returning to a closed state upon de-energization), and switched over by the drive signal from the control unit 7.

When the solenoid valve 8*g* is energized (turned on) for switching to its open shift position B, the left-hand chamber 8*d* of the servo cylinder 8*c* is communicated with the hydraulic source 10, whereupon the servo pistion 8*b* is forced to move rightwardly, as viewed in FIG. 2, due to the difference in cross-sectional area between the left-hand chamber 8*d* and the right-hand chamber 8*e*. This increases a tilting angle of the swash plate 1*a* of the hydraulic pump 1 and hence the delivery rate. When the solenoid valve 8*g* and the solenoid valve 8*h* are both de-energized (turned off) for returning to their closed shift positions A, the oil passage leading to the left-hand chamber 8*d* is cut off and the servo piston 8*b* remains in that position. The tilting angle of the swash plate 1*a* of the hydraulic pump 1 is thereby kept constant, and so is the delivery rate. When the solenoid valve 8*h* is energized (turned on) for switching to its open shift position B, the left-hand chamber 8*d* of the servo cylinder 8*c* is communicated with the reservoir 11 to reduce the pressure in the left-hand chamber 8*d*, whereby the servo piston 8*b* is forced to move leftwardly, as viewed in FIG. 2, under the pressure in the right-hand chamber 8*e*. This decreases the tilting angle of the swash plate 1*a* of the hydraulic pump 1 and hence the delivery rate.

Returning to FIG. 1 again, the unloading valve 20 is connected to the delivery line 12 of the hydraulic pump 1 for holding the differnetial pressure ΔP between the delivery pressure of the hydraulic pump 1 and the maximum load pressure among the actuators less than a setting value.

The unloading valve 20 comprises a pilot pressure chamber 20*a* which is subjected to the maximum load pressure PL, selected by the shuttle valve 9, acting in the valve-closing direction, a pilot pressure chamber 20*b* which is subjected to the delivery pressure Pd of the hydraulic pump 1 acting in the valve-opening direction, a spring 20*c* which is disposed at the end on the same side as the pilot pressure chamber to apply an urging force in the valve-closing direction, and the proportional solenoid 20*d* which is supplied with the aforesaid drive signal from the control unit 7, as an electric signal, to apply a control force Fs in the valve-opening direction dependent on that electric signal (current).

In the absence of the drive signal from the control unit 7, the unloading valve 20 thus arranged works such that the differential pressure between the delivery pressure Pd of the hydraulic pump 1 and the maximum load pressure PL keeps a setting value determined by the urging force of the spring 20*c*. When the electric signal is supplied to the proportional solenoid 20*d*, the proportional solenoid 20*d* applies the control force Fs dependent on the electric signal in opposition to the urging force of the spring 20*c*. Therefore, the unloading valve 20 controls the differential pressure between the delivery pressure Pd of the hydraulic pump 1 and the maximum load pressure PL so as to become a setting value determined by the force which is resulted from subtracting the control force Fs of the proportional solenoid 20*d* from the urging force of the spring 20*c*. In other words, the differential pressure between the delivery pressure Pd of the hydraulic pump 1 and the maximum load pressure PL among the actuators is controlled to be reduced in proportion to the electric signal applied to the proportional solenoid 20*d*.

Figure 3:
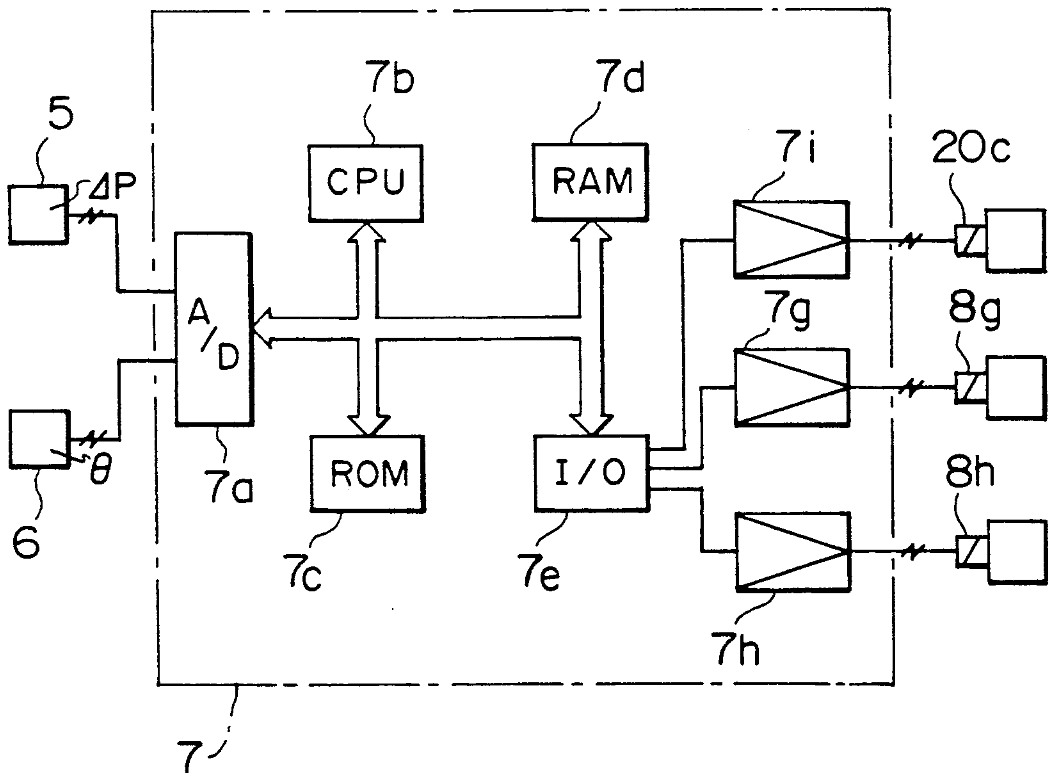
FIG. 3 is a schematic diagram of a control unit.

The control unit 7 is constituted by a microcomputer and, as shown in FIG. 3, comprises an A/D converter 7*a* for converting the differential pressure signal ΔP outputted from the differential pressure sensor 5 and the swash plate position signal θ outputted from the swash plate position sensor 6 into digital signals, a central processing unit (CPU) 7*b*, a read only memory (ROM) 7*c* for storing a control program, a random access memory (RAM) 7*d* for temporarily storing numerical values under calculations, an I/O interface 7*e* for outputting the drive signals, and amplifiers 7*g*, 7*h*, 7*i* connected to the aforesaid solenoid valves 8*g*, 8*h* and the proportional solenoid 20*d* of the unloading valve 20, respectively.

The control unit 7 calculates a swash plate target position θ of the hydraulic pump 1 from the differential pressure signal ΔP outputted from the differential pressure sensor 5 based on the control program stored in the ROM 7*c*, and creates the drive signals from both the swash plate target position θo and the swash plate position signal θ outputted from the swash plate position sensor 6 for making a deviation therebetween zero, followed by outputting the drive signals to the solenoid valves 8*g*, 8*h* of the swash plate position controller 8 from the amplifiers 7*g*, 7*h* via the I/O interface 7*e*. The swash plate 1*a* of the hydraulic pump 1 is thereby controlled so that the swash plate position signal θ coincides with the swash plate target position θo.

Further, the control unit 7 calculates the control force Fs of the proportional solenoid 20*d* from the calculated result of the swash plate target position θo based on the control program stored in the ROM 7*c*, and creates the drive signal corresponding to the calculated control force, followed by outputting the drive signal to the proportional solenoid 20*d* of the unloading valve 20 from the amplifiers 7*i* via the I/O interface 7*e*.

Figure 4:
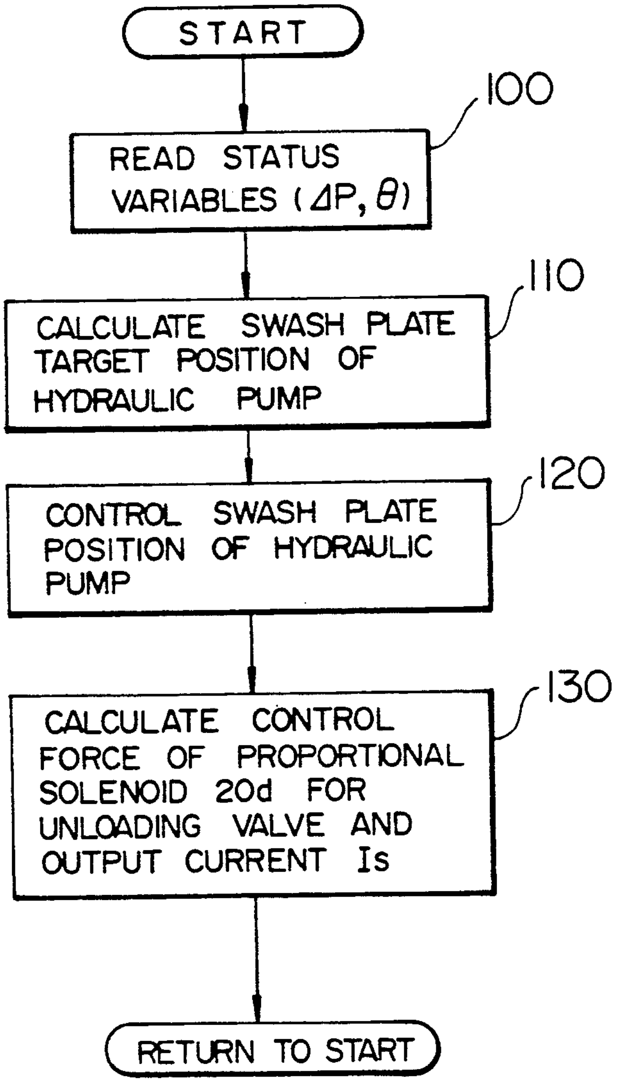
FIG. 4 is a flowchart showing the control sequence carried out in the control unit.

Operation of this embodiment will be described below in detail by referring to FIG. 4. FIG. 4 shows the control program stored in the ROM 7*c* of FIG. 3 in the form of a flowchart.

First, in a step 100, respective outputs of the differential pressure sensor 5 and the swash plate position sensor 6 are entered to the control unit 7 via the A/D converter 7*a* and stored in the RAM 7*d* as the differential pressure signal ΔP and the swash plate position signal θ.

Figure 5:
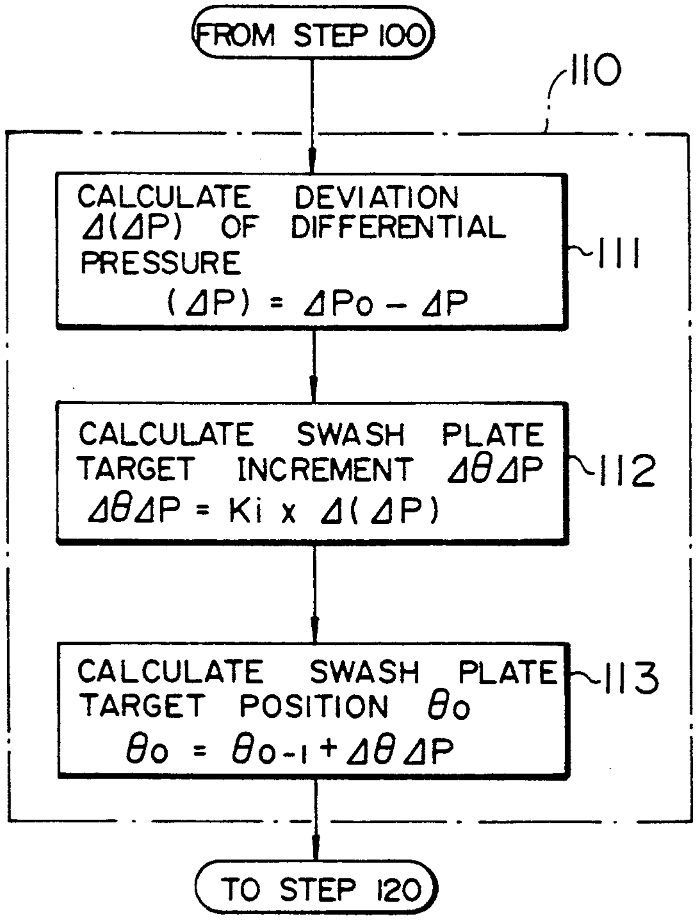
FIG. 5 is a flowchart showing details of a step of calculating a swash plate target position of a hydraulic pump in the flowchart of FIG. 4.
Figure 6:
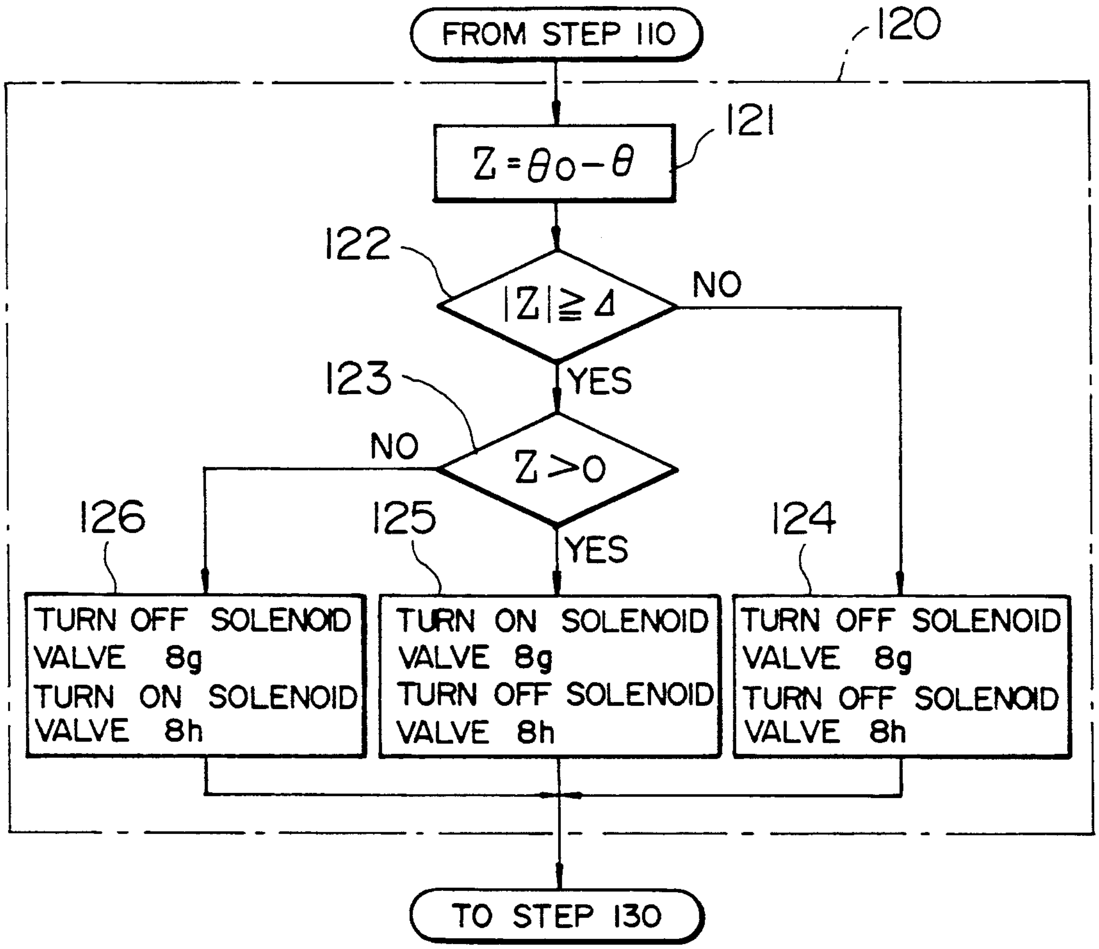
FIG. 6 is a flowchart showing details of a step of controlling the swash plate position of the hydraulic pump in the flowchart of FIG. 4.

Next, in a step 110, the swash plate target position θo of the hydraulic pump 1 is calculated through integral control. FIG. 5, shows details of the step 110. In a step 111 of FIG. 5, a deviation Δ (ΔP) between a preset target value ΔPo of the differential pressure and the differential pressure signal ΔP entered in the step 100 is calculated. The differential pressure target value ΔPo is set as a fixed value in this embodiment, but it may be a variable value.

Then, in a step 112, an increment $\Delta\theta_{\Delta P}$ of the swash plate target position is calculated. Specifically, a preset control coefficient Ki is multiplied by the above differential pressure deviation Δ (ΔP) to obtain the increment $\Delta\theta_{\Delta P}$ of the swash plate target position. Assuming that a period of time required for the program proceeding from the step 100 to 130 (i.e., cycle time) is tc, the increment of the swash plate target position for the cycle time tc and thus $\Delta\theta_{\Delta P}$/tc gives a target tilting speed of the swash plate. Stated otherwise, the control coefficient Ki corresponds to a control gain for the changing speed of the swash plate 1*a* of the hydraulic pump 1, and is set to provide a changing speed at which the tilting motion of the swash plate 1*a* becomes not too slow, when the operation amount of the flow control valve 3 is relatively large.

Then, in a step 113, the increment $\Delta\theta_{\Delta P}$ is added to the swash plate target position θo−1 which has been calculated in the last cycle, to obtain the current (new) swash plate target position θo.

Figure 8:
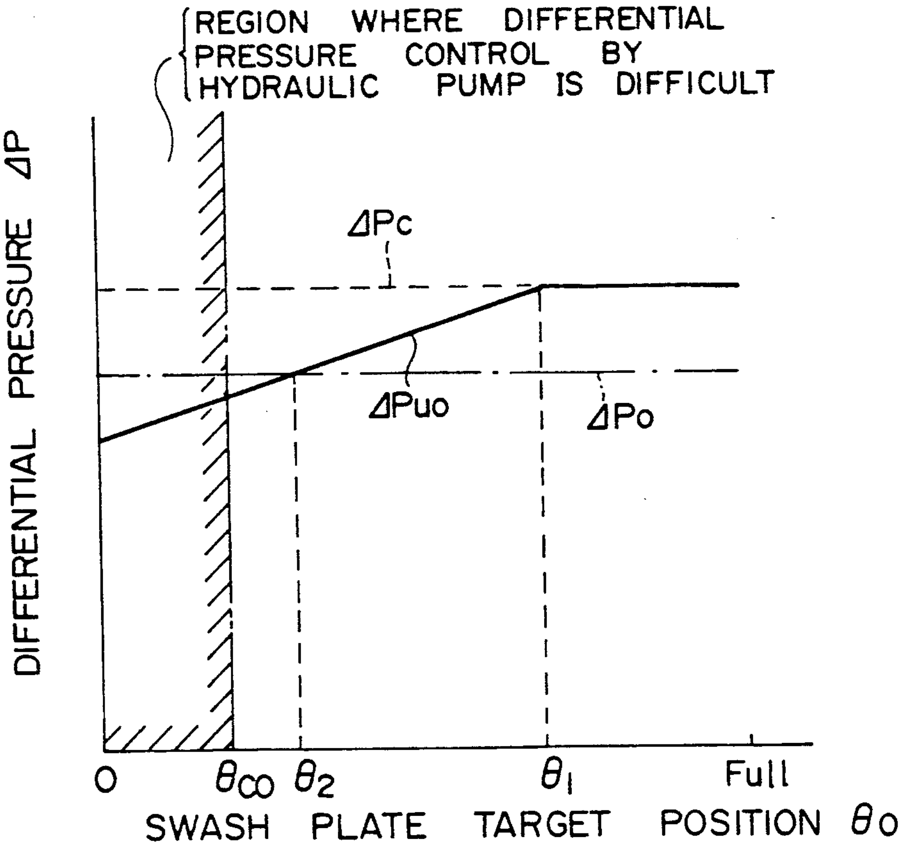
FIG. 8 is a characteristic graph showing the relationship between the swash plate target position and a setting value of an unloading valve.

Next, returning to FIG. 4, a step 120 controls the swash plate position of the hydraulic pump. FIG. 8 shows details of the control. In a step 121 of FIG. 6, a deviation Z between the swash plate target position θo calculated in the step 110 and the swash plate position signal θ entered in the step 100 is calculated.

Then, in a step 122, it is determined whether an absolute value of the deviation Z is within a dead zone Δ for the swash plate position control. If |Z| is determined to be smaller than the dead zone Δ (|Z|<Δ), then the control flow proceeds to a step 124 where OFF signals are outputted to the solenoid valves 8*g*, 8*h* for rendering the swash plate position fixed. If |Z| is determined to be not smaller than the dead zone Δ (|Z|≧Δ) in the step 122, then the control flow proceeds to a step 123. The step 123 determines whether Z is positive or negative. If Z is determined to be positive (Z>0), then the control flow proceeds to a step 125. In the step 125, an ON and OFF signal are outputted to the solenoid valves 8*g* and 8*h*, respectively, for moving the swash plate position in the direction to increase.

If Z is determined to be zero or negative (Z≦0) in the step 123, the control flow proceeds to step 126. In the step 126, an OFF and ON signal are outputted to the solenoid valves 8*g* and 8*h*, respectively, for moving the swash plate position in the direction to decrease.

Through the foregoing steps 121-126, the swash plate position is so controlled as to coincide with the target position.

Thus, through the above steps 110 and 120, the swash plate position, i.e., the displacement volume, of the hydraulic pump 1 is controlled such that the delivery pressure Pd of the hydraulic pump 1 is always higher by the target value ΔP of the differential pressure than the maximum load pressure PL among the actuators. In short, the hydraulic pump 1 is subjected to the LS control.

Figure 7:
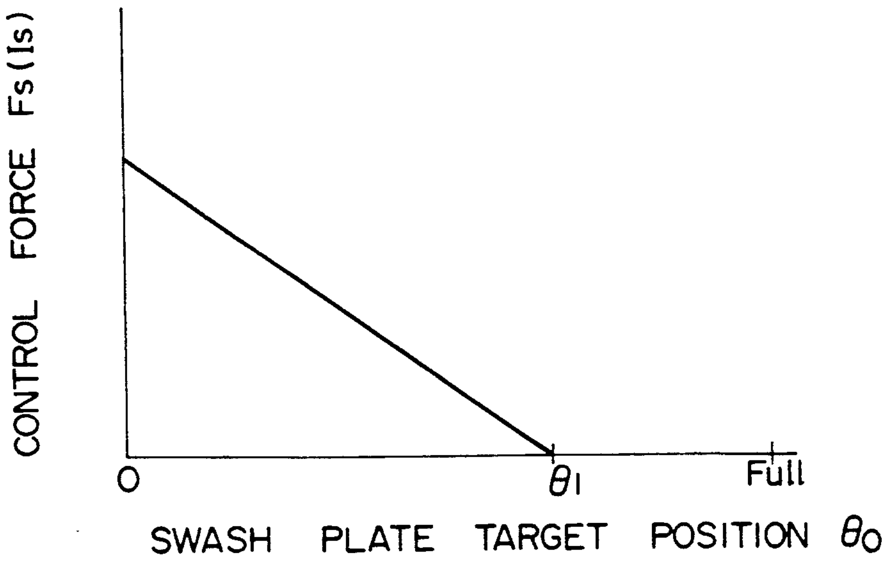
FIG. 7 is a characteristic graph showing the relationship between the swash plate target position and the control force.

Next, returning to FIG. 4 again, a step 130 calculates the control force Fs applied by the proportional solenoid 20*d* of the unloading valve 20 from the swash plate target position θo calculated in the step 110. This calculation of the control force Fs is performed by storing table data as shown in FIG. 7 in the ROM 7*c* beforehand, and reading a value of the control force Fs from the table data which corresponds to the swash plate target position θo. As an alternative, the control force Fs may be derived by programming arithmetic equations beforehand and calculating a desired value in accordance with the equations.

In the table data shown in FIG. 7, the functional relationship between the swash plate target position θo and the control force Fs is set such that the control force Fs is large when θo is small, and it decreases as θo increases. Then, the magnitude of the control force Fs is selected such that a setting value ΔPuo of the unloading valve 20, which is determined by a resultant of the control force Fs and the urging force of the spring 20*c*, is given as shown in FIG. 8, by way of example.

More specifically, in FIG. 8, ΔPo represents the differential pressure target value ΔPo under the LS control by the hydraulic pump 1 as mentioned above, and ΔPc represents the setting value given by the urging force of the spring 20*c*. ΔPc is set higher than ΔPo. A swash plate target position θco indicated by a two-dot-chain line stands for a boundary value; i.e., in a region smaller than that value, the hydraulic pump 1 is difficult to control the differential pressure ΔP under the LS control. A range of the swash plate target position from 0 to ♭1 corresponds to a region where the control force Fs shown in FIG. 7 is applied. In this region, the control force Fs is subtracted from the urging force of the spring 20*c* to provide the setting value ΔPuo which is changed as shwon. More specifically, in a region where the swash plate target position θo is less than θ2 somewhat beyond θco, the setting value ΔPuo of the unloading valve is smaller than the differential pressure target value ΔPo for the LS control. In a region where the swash plate target position θo is beyond θ2 and the stable LS control is enabled, the setting value ΔPuo becomes higher than the differential pressure target value ΔPo. With the swash plate target position θo exceeding θ1, the setting value ΔPuo is equal to the value ΔPc given by the urging force of the spring 20*c*.

The control force Fs thus derived int he step 130 is converted into a current is through the I/O port 7*e* and the amplifier 7*i*, the current is being outputted to the proportional solenoid 20*d* of the unloading valve 20. Note that while the I/O port 7*e* is used in the illustrated embodiment, the current is may be outputted by using a D/Z converter and making a voltage-current conversion in the amplifier 7*i*.

Following completion of the step 130, the control flow returns to the first step 100 again. Since the above steps 110-130 are carried out once for the cycle time tc mentioned above, the tilting speed of the swach plate is eventually controlled to the aforesaid target speed $\Delta\theta_{\Delta P}$/tc in the step 120.

Figure 9:
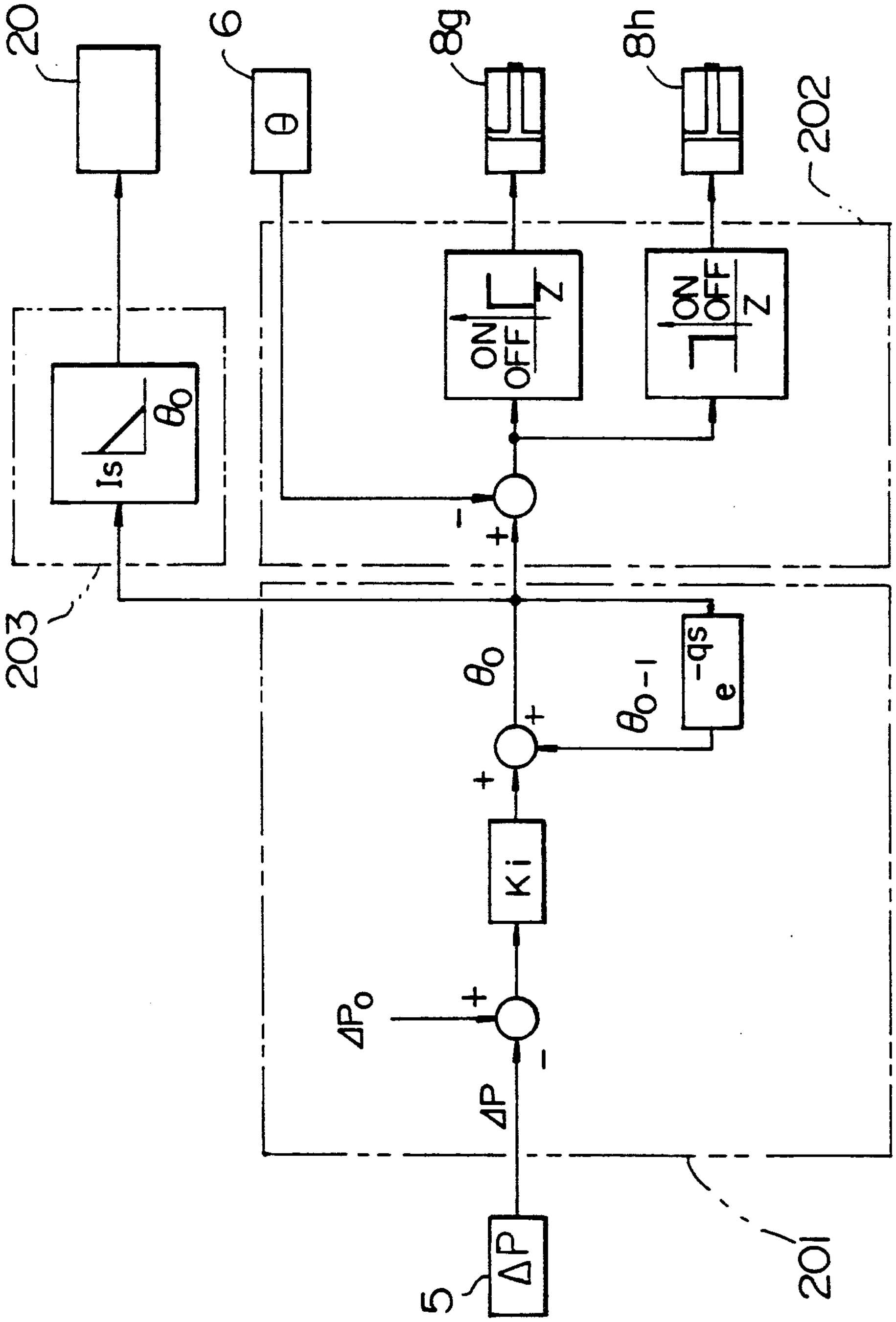
FIG. 9 is a block diagram showing control steps of the first embodiment together in the form of blocks.

The above-explained control steps are shown together in FIG. 9 in the form of blocks. In FIG. 9, a block 201 corresponds to the step 110 in FIG. 4, a block 202 the step 120, and a block 203 the step 130, respectively.

In this embodiment arranged as stated above, when the operation amount of the flow control valve 3 is small and so is the demanded flow rate, the swash plate target position θo calculated in the step 110 in FIG. 4 and the block 201 in FIHG. 9 is also small, whereupon the large control force Fs corresponding to the swash plate target position less than θco in FIG. 7 is calculated int he step 130 and the block 203. Therefore, the setting value ΔPuo obtained by subtracting the control force Fs fromt he urging force of the spring 20*c* in the unloading valve 20 becomes smaller than the differential pressure target value ΔPo for the LS control, as shown in FIG. 8, so that the unloading valve 20 functions with priority over the LS control in the step 120. Consequently, the differntial pressure ΔP between the delivery pressure Pd of the hydraulic pump 1 and the maximum load pressure PL among the actuators is controlled by the unloading valve 20, enabling stable control of the differential pressure through the unloading valve 20.

When the operation amount of the flow control valve 3 is increased and so is the demanded flow rate, the swash plate target position θo calculated in the step 110 in FIG. 4 and the block 201 in FIG. 9 is also increased, whereupon the small control force Fs corresponding to the swash plate target positoin greater than θco in FIG. 7 is calculated in the step 130 and the block 203. Therefore, the setting value ΔPuo obtained by subtracting the control force Fs from the urging force of the spring 20c in the unloading valve 20 becomes larger than the differential pressure target value ΔPo for the LS control, as shown in FIG. 8, so that the differential pressure ΔP between the delivery pressure Pd of the hydraulic pump 1 and the maximum load pressure PL among the actuators is controlled to be held at the differential pressure target value ΔPo through the LS control in the step 120 and the block 202. Here, as mentioned before, the control coefficient (or control gain) Ki in the step 112 of FIG. 5 is set to provide a changing speed at which the tilting motion of the swash plate 1*a* becomes not too slow, when the operation amount of the flow control valve 3 is relatively large. Consequently, quick control of the hydraulic pump 1 is enabled through the LS control. In addition, the hydraulic fluid will not be discharged from the unloading valve 20, resulting in no energy loss.

A second embodiment of the present invention will be described below with reference to FIGS. 10 and 11. In this embodiment, pump control means is constructed in a hydraulic manner and an actual swash plate position θ is used as a value associated with the demanded flow rate of the flow control valve 3 in place of the swash plate target position θo.

Figure 10:
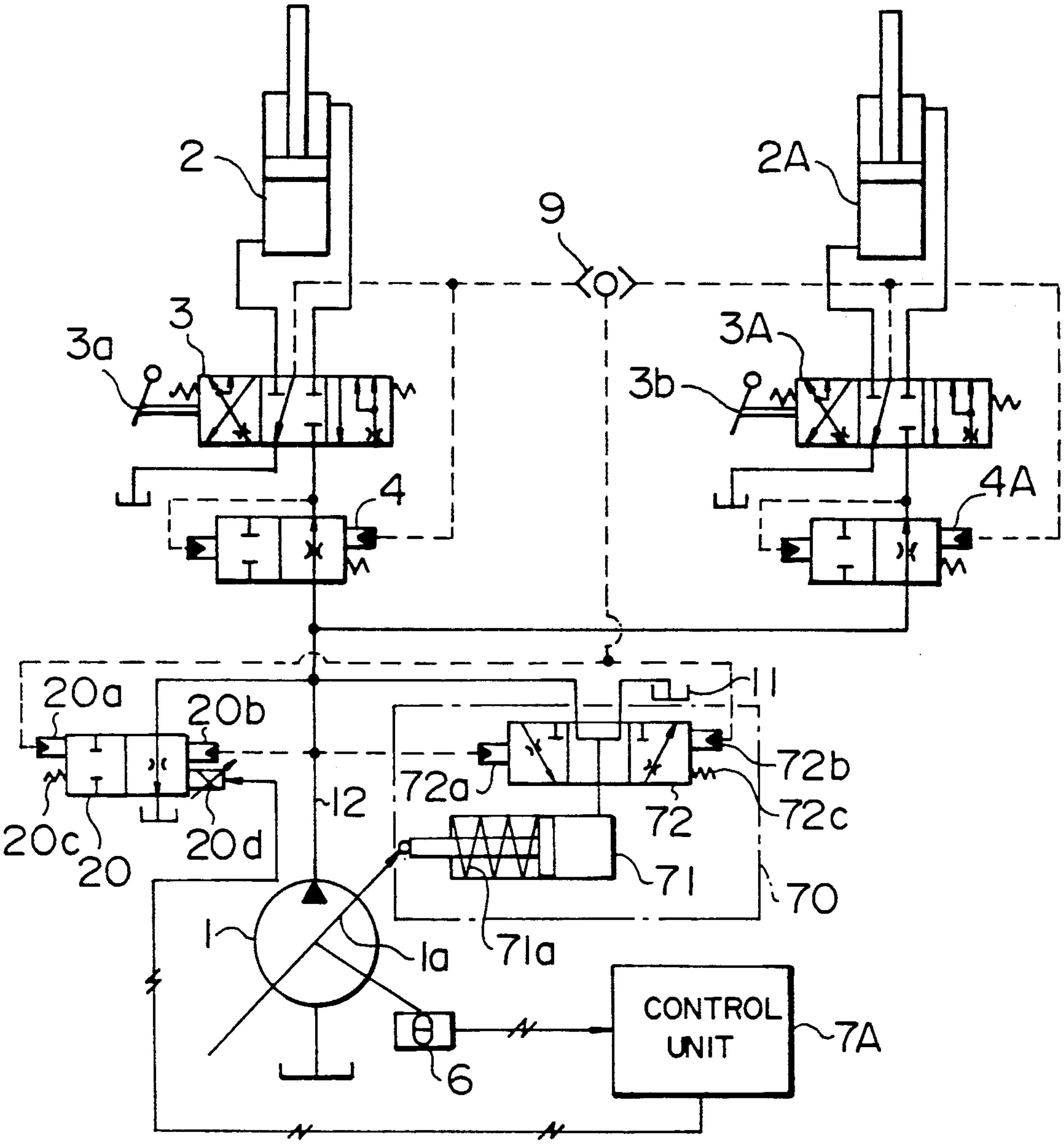
FIG. 10 is a schematic diagram of a load sensing hydraulic drive circuit equipped with a control system according to a second embodiment of the present invention.
Figure 11:
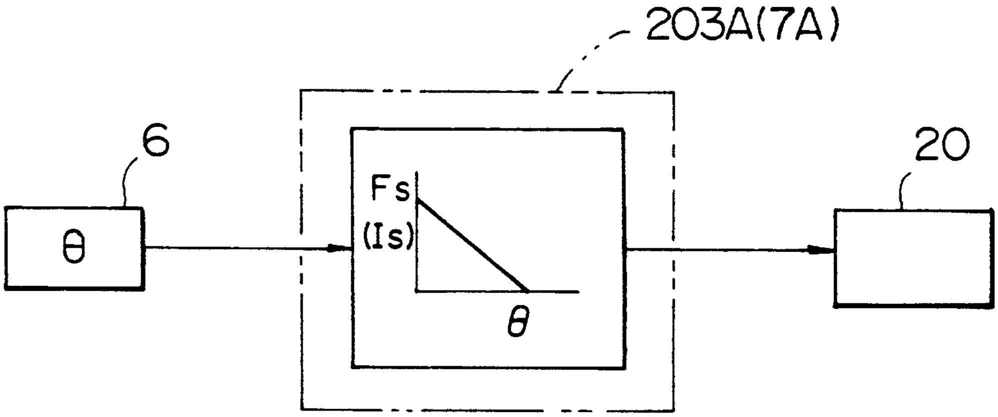
FIG. 11 is a block diagram showing control of the settting value of the unloading valve in the second embodiment.

In FIG. 10, denoted by reference numeral 70 isn an LS regulator constituting pump control means of the embodiment. The LS regugulator 70 comprises a working cylinder 71 coupled to the swash plate 1*a* of the hydraulic pump 1 for driving the swash plate 1*a*, and a control valve 72 for controlling inflow and outflow of the hydraulic fluid with respect to the working cylinder 71m with a spring 71*a* housed in the working cylinder 71. The control valve 72 has a drive part 72*a* disposed at one of opposite ends and subjected to the delivery pressure Pd of the hydraulic pump 1, a drive part 72*b* disposed at the other end and subjected to the maximum load pressure PL selected by the shuttle valve 9, and a spring 72*c* disposed at the end on the same side as the drive part 72*b*.

Under a condition that the maximum load pressure PL selected by the shuttle valve 9 is the load pressure of the actuator 2, when the maximum load pressure PL is increased, the control valve 72 is moved leftwardly on the drawing and the working cylinder 71 is communicated with the reservoir 11, causing the working cylinder 71 to move in the direction of contraction thereof by a force of the spring 71*a* for increasing the tilting amount of the swash plate 1*a*. Therefore, the delivery rate of the hydraulic pump 1 is increased to raise the delivery pressure Pd. With this increase in the pump delivery pressure, the control valve 72 is returned rightwardly on the drawing. Then, when the differential pressure ΔP between the pump delivery pressure and the maximum load pressure reaches a setting value determined by the urging force of the spring 72*c*, the control valve 72 si stopped, whereby the contracting operation of the working cylinder 71 is also stopped. Conversely, when the maximum load pressure PL is reduced, the control valve 72 is driven rightwardly on the drawing and the working cylinder 71 is communicated with the delivery line 12, causing the working cylinder 71 to move in the direction of extension thereof for decreasing the tilting amount of the swash plate 1*a*. Therefore, the delivery rate of the hydraulic pump 1 is decreased to lower the pump delivery pressure. With this decrease in the pump delivery pressure, the control valve 72 is returned leftwardly on the drawing. Then, when the differnetial pressure ΔP between the pump delivery pressure and the maximum load pressure reaches the setting value determined by the urging force of the spring 72*c*, the control valve 72 is stopped, whereby the extending operation of the working cylinder 71 is also stopped. As a result, the delivery pressure Pd of the hydraulic pump 1 is controlled to be higher by the setting value dependent on the spring 72*c* than the load pressure of the actuator 2.

In the foregoing operation, the changing speed of the swash plate 1*a* is determined by a control gain of the LS regulator 70, the control gain of the LS regulator 70 being determined by the spring constants of the springs 71*a*, 72*c*. Stated otherwise, the differential pressure ΔP between the delivery pressure Pd of the hydraulic pump 1 and the load pressure PL of the actuator 2 remains the same, the changing speed of the swash plate 1*a* takes a predetermined value determined by the spring constants of the springs 71*a*, 72*c* regardless of the position of the swash plate 1*a*. Similarly to the control coefficient Ki in the first embodiment, the spring constants of the springs 71*a*, 72*c*, i.e., the control gain of the LS regulator 70, is set to provide a changing speed at which the tilting motion of the swash plate 1*a* becomes not too slow, when the operation amount of the flow control valve 3 is relatively large.

The unloading valve 20 is constructed in the same manner as the first embodiment. In a control unit 7A, as shown in a control block 203A of FIG. 11, the control force Fs applied by the porportional solenoi 20*d* of the unloading valve 20 is calculated fromt he actual swash plate psotion θ detected by the swash plate position sensor 6 as a value associated with the demanded flow rate of the flow control valve 3. This calculation of the control force Fs is performed by storing the relationship between θ and Fs like that between θo and Fs shown in FIG. 7 in the ROM 7*c* (see FIG. 3) beforehand, and reading a value of the control force Fs which corresponds to the swash plate position θ.

Also in this embodiment arranged as stated above, since the relationship between θ and Fs is similar to that between θo and Fs shown in FIG. 7, the setting value obtained by subtracting the control force Fs from the urging force of the spring 20*c* in the unloading valve 20 is given by ΔPuo as shown in FIG. 8. Consequently, this embodiment can also control the differential pressure ΔP in a like manner to the first embodiment and provide the similar advantageous effect to that in the first embodiment.

A third embodiment of the present invention will be described below with reference to FIGS. 12 and 13. This embodiment is constructed to determine the setting value of the unloading valve by using a porportional solenoid alone.

Figure 12:
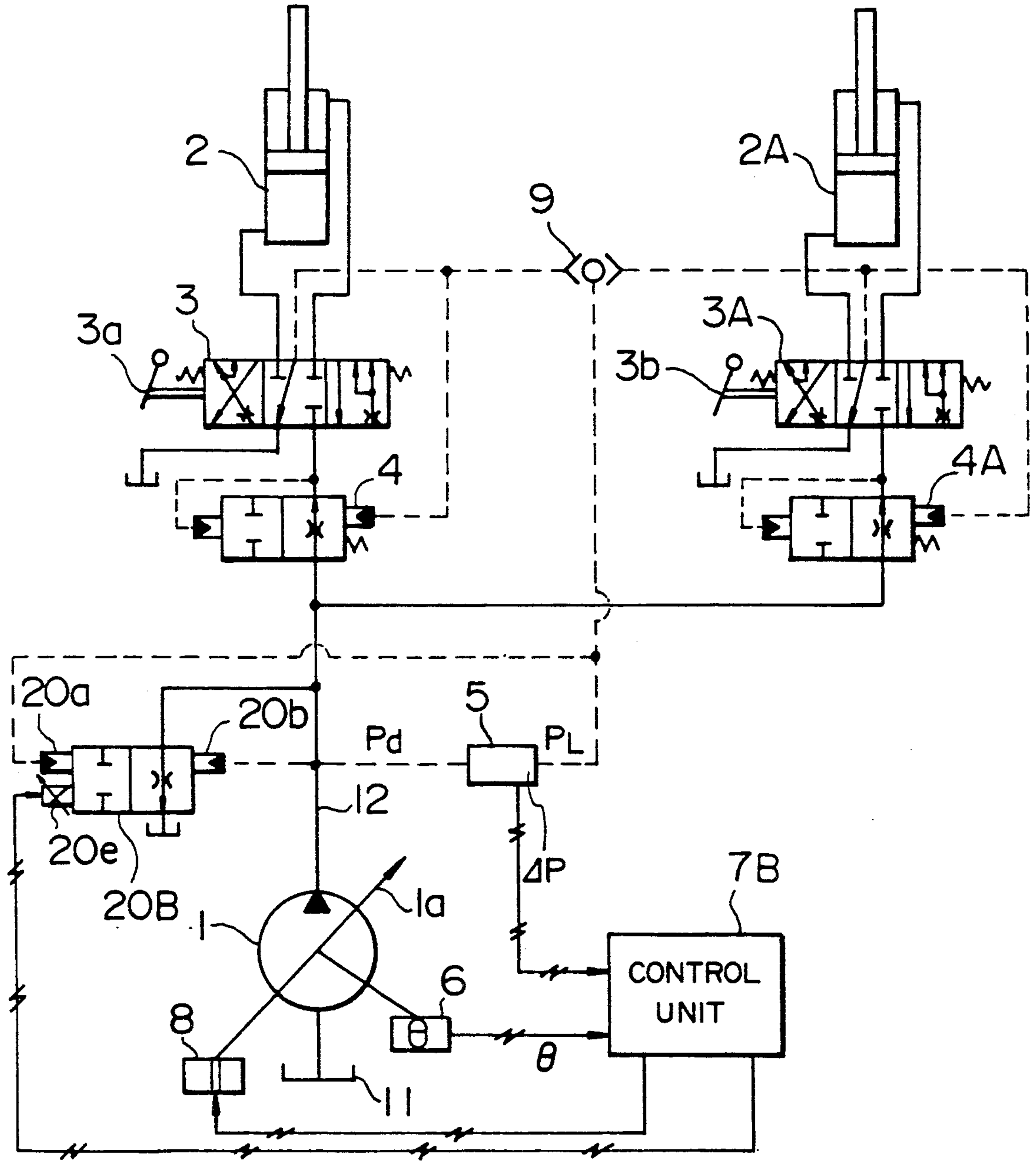
FIG. 12 is a schematic diagram of a load sensing hydraulic drive circuit equipped with a control system according to a third embodiment of the present invention.
Figure 13:
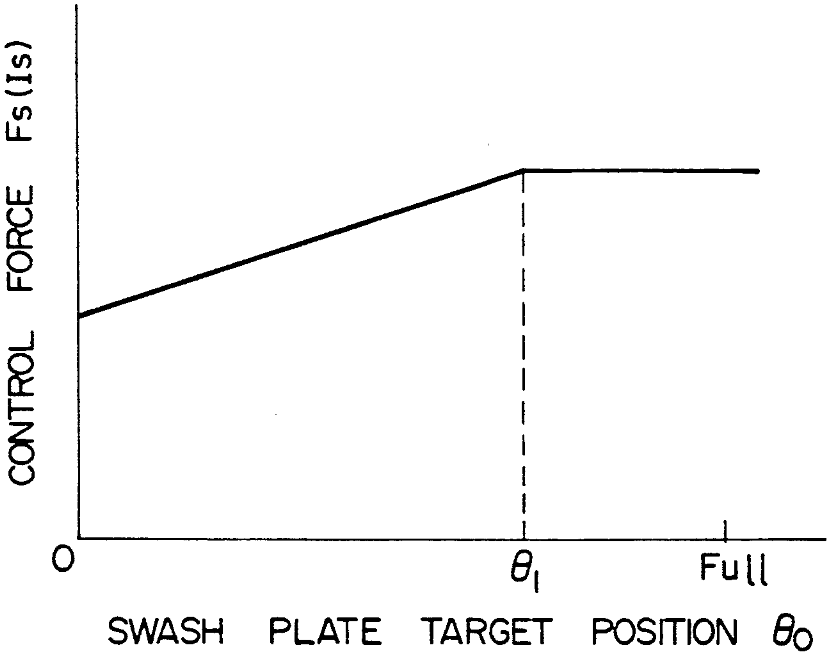
FIG. 13 is a characteristic graph showing the relationship between the swash plate target position and the control force in the third embodiment.

In FIG. 12, an unloading valve 20B has only a proportional solenoid 20*e* for applying a control force int he valve-closing direction in place of the arrangement comprising the spring 20*c* and the proportional solenoid 20*d* in the first embodiment. Further, a control unit 7B stores therein the relationship between the swash plate target position θo and the control force Fs, which directly corresponds to the setting value ΔPuo in FIG. 8, i.e., the relationship between the swash plate target position θo and the control force Fs that the control force Fs is small when the swash plate target position θo (demanded flow rate) is small, and it increases as the swash plate target position θo (demanded flow rate) increases. Then, the corresponding control force Fs is read out from the swash palte target position θo and the corresponding current Is is outputted to the proportional solenoid 20*e*. As a result, the setting value ΔPuo shown in FIG. 8 can be provided in the unloading valve by using the proportional solenoid 20*e* alone.

In short, this embodiment can also apply the setting value ΔPuo shown in FIG. 8 and thus provide the similar advantageous effect to that in the first embodiment.

A fourth embodiment of the present invention will be described below with reference to FIGS. 14 and 15. This embodiment is to detect, as values associated with the amounts of control levers of the respective flow control valves and employ a total value of the detected input amounts.

Figure 14:
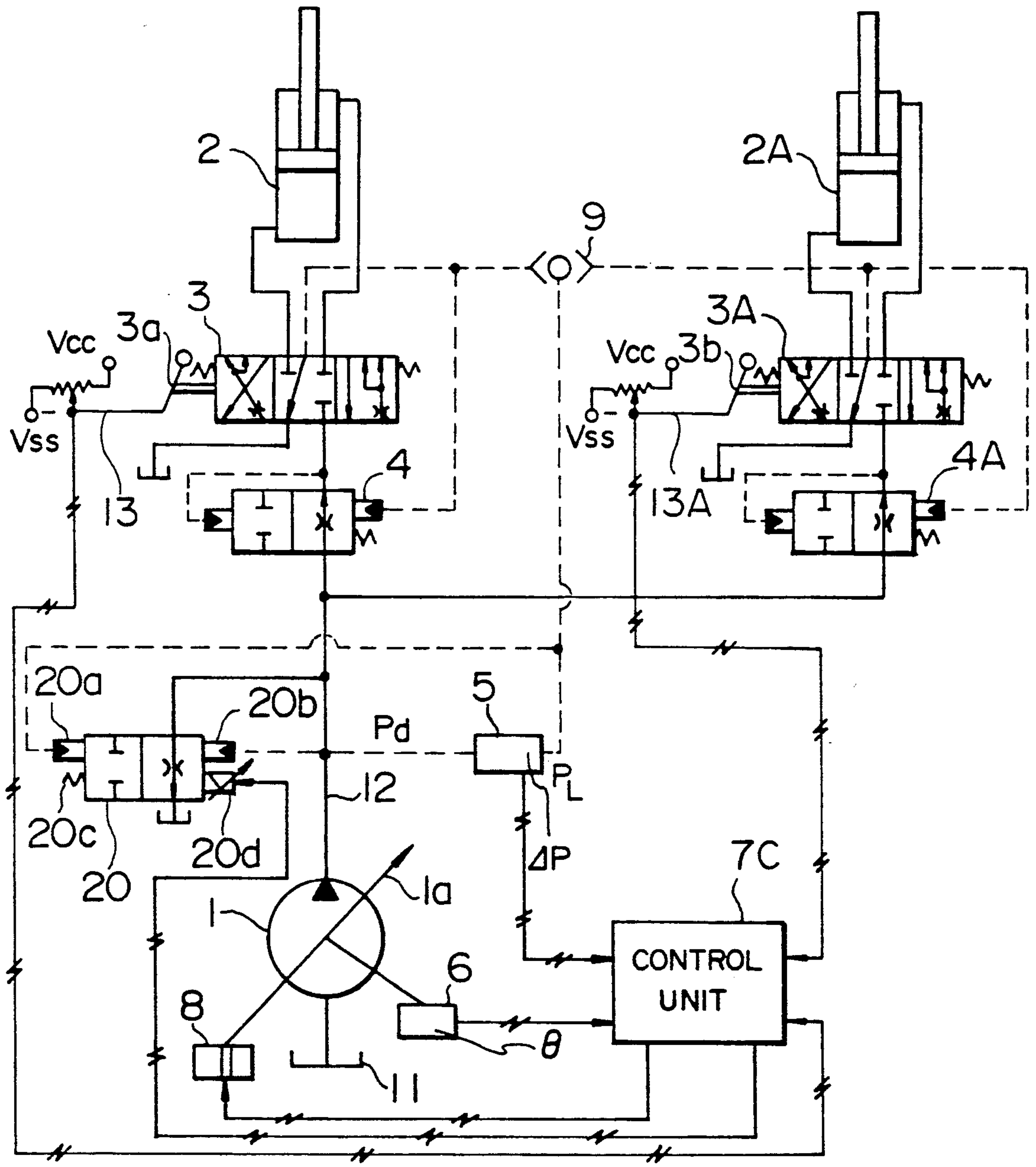
FIG. 14 is a schematic diagram of a load sensing hydraulic drive circuit equipped with a control system according to a fourth embodiment of the present invention.

In FIG. 14, a control system of this embodiment has input amount sensors 13, 13A which are respectively coupled to control levers 3*a*, 3*b* for detecting input amounts, i.e., demanded flow rates, of the flow control valves 3, 3A, and which convert the detected input amounts into electric signals X1, X2, followed by outputting those electric signals to a control unit 7C. The remaining hardware arrangement is the same as that in the first embodiment of FIG. 1 and identical components to those shown in FIG. 1 are noted by the same reference numerals.

Figure 15:
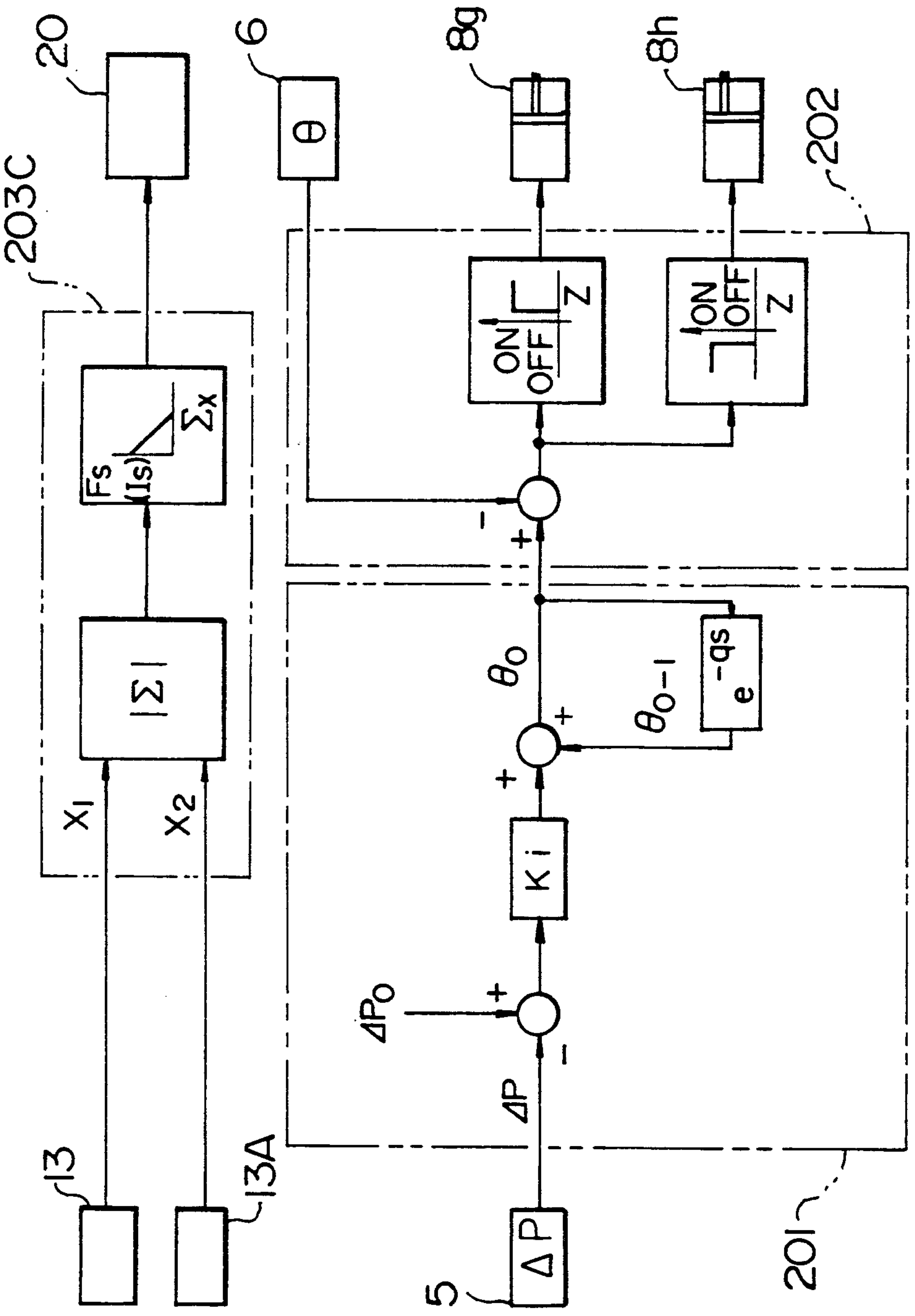
FIG. 15 is a block diagram showing control according to the fourth embodiment.

In the control unit 7C, as shown at a control block 203C in FIG. 15, absolute values of the input amounts of the flow control valves 3, 3A respectively represented by the electric signals X1, X2 from the input amount sensors 13, 13A are added, as a value associated with the demanded flow rate of the flow control valve 3, to calculate a total value ΣX of the flow rates demanded by the flow control valves 3, 3A. Then, the control force Fs applied by the proportional solenoid 20*d* of the unloading valve 20 is calculated from the total value ΣX of those demanded flow rates. This calculation of the control force Fs is performed by storing the relationship between ΣX and Fs like that between θo and Fs shown in FIG. 7 in the ROM 7*c* (see FIG. 3) beforehand, and reading a value of the control force Fs which corresponds to the total value ΣX of the demanded flow rates.

The control unit 7C controls the solenoid valves 8*g*, 8*h* of the swash plate position controller 8 as with the case of the first embodiment shown in Fig. 9.

Also in this embodiment arranged as stated above, since the relationship between ΣX and Fs is similar to that between θo and Fs shown in FIG. 7, the setting value obtained by subtracting the control force Fs from the urging force of the spring 20*c* in the unloading valve 20 is given by ΔPuo as shown in FIG. 8. Consequently, this embodiment can also control the differential pressure ΔP in a like manner to the first embodiment and provide the similar advantageous effect to that in the first embodiment.

According to the present invention, as will be apparent from the foregoing explanation, the differential pressure between the delivery pressure of the hydraulic pump and the maximum load pressure is controlled by the unloading valve when the operation amount of the flow control valve is small and so is the demanded flow rate, and it is controlled by the pump control means when the operation amount of the flow control valve is increased and so is the demanded flow rate, with the result that stable control of the differential pressure with small pressure change can be achieved when the operation amount of the flow control valve is small, and the hydraulic pump can be controlled with a quick response when the operation amount of the flow control valve is large. In addition, when the operation amount of the flow control valve is large, the hydraulic fluid will not be discharged from the unloading valve, thus resulting in no energy loss.

What is claimed is:

1. A control system for a load sensing hydraulic drive circuit comprising at least one hydraulic pump provided with displacement volume varying means, at least one hydraulic actuator driven by a hydraulic fluid delivered from said hydraulic pump, a flow control valve connected between said hydraulic pump and said actuator for controlling a flow rate of the hydraulic fluid supplied to said actuator, pump control means for controlling a delivery rate of said hydraulic pump such that a delivery pressure of said hydraulic pump is higher by a first predetermined value than a load pressure of said actuator, and an unloading valve connected between said hydraulic pump and said actuator for holding a differential pressure between the delivery pressure of said hydraulic pump and the load pressure of said actuator less than a second predetermined value, said control system further comprising:

first means for detecting a value associated with a demanded flow rate of said flow control valve, and second means for controlling said unloading valve based on said value associated with the demanded flow rate detected by said first means such that said second predetermined value is smaller than said first predetermined value when said demanded flow rate is small, and said second predetermined value becomes larger than said first predetermined value as said demanded flow rate increases.

2. A control system for a load sensing hydraulic drive circuit according to claim 1, wherein:

said pump control means includes third means for determining, based on the differential pressure between the delivery pressure of said hydraulic pump and the load pressure of said actuator, a target displacement volume adapted to hold said differential pressure at said first predetermined value, and fourth means for controlling said displacement volume varying means of said hydraulic pump such that a displacement volume of said hydraulic pump coincides with the target displacement volume determined by said third means, said first means comprises means for detecting, as said value associated with the demanded flow rate, the target displacement volume determined by said third means, and said second means comprises means for controlling said unloading valve based on said target displacement volume.

3. A control system for a load sensing hydraulic drive circuit according to claim 1, wherein:

said first means comprises means for detecting, as said value associated with the demanded flow rate, an actual displacement volume of said hydraulic pump, and said second means comprises means for controlling said unloading valve based on said actual displacement volume.

4. A control system for a load sensing hydraulic drive circuit according to claim 1, wherein:

said first means comprises means for detecting, as said value associated with the demanded flow rate, an operation amount of said flow control valve, and said second means comprises means for controlling said unloading valve based on said operation amount.

5. A control system for a load sensing hydraulic drive circuit according to claim 1, comprising a plurality of hydraulic actuators driven by the hydraulic fluid delivered from said hydraulic pump, and a plurality of flow control valves respectively connected between said hydraulic pump and said plural actuators for controlling flow rates of the hydraulic fluid supplied to said actuators, wherein:

said first means comprises means for detecting, as said value associated with the demanded flow rate, respective operation amounts of said plural flow control valves, and means for calculating a total value of the operation amounts detected, and said second means comprises means for controlling said unloading valve based on said total value of the operation amounts.

6. A control system for a load sensing hydraulic drive circuit according to claim 1, wherein said second means includes means for calculating, based on said value associated with the demanded flow rate detected by said first means, a control force serving to make said second predetermined value smaller than said first predetermined value when said demanded flow rate is small and to make said second predetermined value larger than said first predetermined value as said demanded flow rate increases, and then outputting an electric signal dependent on the calculated control force, and means for receiving said electric signal to produce said control force.

7. A control system for a load sensing hydraulic drive circuit according to claim 1, wherein said unloading valve has a spring for applying an urging force in the valve-closing direction, and drive means for applying a control force in the valve-opening direction, and wherein said second means includes means for determining, based on said value associated with the demanded flow rate detected by said first means, a control force that is large when said demanded flow rate is small and becomes smaller as said demanded flow rate increases, and means for causing the drive means of said unloading valve to produce said control force.

8. A control system for a load sensing hydraulic drive circuit according to claim 1, wherein said unloading valve has drive means for applying a control force in the valve-closing direction, and wherein said second means includes means for determining, based on said value associated with the demanded flow rate detected by said first means, a control force that is small when said demanded flow rate is small and becomes larger as said demanded flow rate increases, and means for causing the drive means of said unloading valve to produce said control force.

* * * * *